US007102622B2

(12) United States Patent
Takasu et al.

(10) Patent No.: US 7,102,622 B2
(45) Date of Patent: Sep. 5, 2006

(54) PRODUCTION EQUIPMENT MONITORING DEVICE

(75) Inventors: Kentaro Takasu, Nishio (JP); Kenji Yoshida, Anjo (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 433 days.

(21) Appl. No.: 10/266,612

(22) Filed: Oct. 9, 2002

(65) Prior Publication Data

US 2003/0122793 A1 Jul. 3, 2003

(30) Foreign Application Priority Data

Oct. 9, 2001 (JP) ............................. 2001-311803

(51) Int. Cl.
*G09G 5/00* (2006.01)

(52) U.S. Cl. ...................... 345/173; 178/18.1; 700/184

(58) Field of Classification Search ........ 345/173–179, 345/168, 169, 156, 157; 178/18.01, 18, 18.1; 700/180, 184

See application file for complete search history.

(56) References Cited

U.S. PATENT DOCUMENTS

| 5,122,717 | A | * | 6/1992 | Hayashi ...................... 318/569 |
| 5,159,558 | A | * | 10/1992 | Seki et al. ................... 700/185 |
| 5,327,350 | A | * | 7/1994 | Endo .......................... 700/179 |
| 5,355,307 | A | * | 10/1994 | Scharnhorst ................. 700/83 |
| 5,392,207 | A | * | 2/1995 | Wilson et al. ................ 700/64 |
| 5,465,215 | A | * | 11/1995 | Strickland et al. .......... 700/180 |
| 5,984,503 | A | * | 11/1999 | Strickland et al. ............ 700/95 |
| 6,466,827 | B1 | * | 10/2002 | Stine ........................... 700/18 |

FOREIGN PATENT DOCUMENTS

| JP | 61-112213 | 5/1966 |
| JP | 5-53641 | 3/1993 |
| JP | 5-113820 | 5/1993 |
| JP | 7-84616 | 3/1995 |
| JP | 9-179607 | 7/1997 |
| JP | 9-292942 | 11/1997 |
| JP | 2000-293208 | 10/2000 |
| JP | 2001-154709 | 6/2001 |

* cited by examiner

*Primary Examiner*—Xiao Wu
(74) *Attorney, Agent, or Firm*—Oblon, Spivak, McClelland, Maier & Neustadt, P.C.

(57) ABSTRACT

A production equipment monitoring device comprises a display panel providing a touch switch function, a touch switch display controller displaying on the display panel a touch switch corresponding to a general segmentary operating process, an operating status display controller distinguishably displaying thereon an operating status of the touch switch corresponding to the general segmentary operating process presently executed, a detail process information memory memorizing a name of a detail operating process and an address of the programmable logic controller to be referred thereto when judging an actual status of the detail operating process, and a detail information display controller displaying thereon, when the touch switch is pressed, the name of the detail operating process included in the general segmentary operating process corresponding to the pressed touch switch, and the actual status of the detail operating process obtained by the address of the programmable logic controller.

4 Claims, 8 Drawing Sheets

LAMP FOR
SCREEN CHANGE

FIG. 3

| ID | | LP11 | LP12 | ... | LP31 | LP32 | ... |
|---|---|---|---|---|---|---|---|
| DISPLAY NAME | | WORKPIECE TRANSFER IN/OUT | FIXTURE CLAMP | | PLC OPERATION | NC OPERATION | |
| LAMP COLOR | ON | RD | RD | | RD | RD | |
| | OFF | BL | BL | | BL | BL | |
| DISPLAY ADDRESS | LIGHT | — | — | | M502 | M510 | |
| | FLASH | M3F1 | M3F3 | | — | — | |
| DETAIL PROCESS INFORMATION 1 | NAME | START WORKPIECE TRANSFER IN/OUT | START FIXTURE CLAMP | | — | — | |
| | ADDRESS | M441 | M450 | | — | — | |
| DETAIL PROCESS INFORMATION 2 | NAME | RISE TRANSFER | FINISH FIXTURE CLAMP | | — | — | |
| | ADDRESS | X310 | M451 | | — | — | |
| DETAIL PROCESS INFORMATION 3 | NAME | ADVANCE TRANSFER | — | | — | — | |
| | ADDRESS | X311 | — | | — | — | |
| DETAIL PROCESS INFORMATION 4 | NAME | FINISH WORKPIECE TRANSFER IN/OUT | — | | — | — | |
| | ADDRESS | M445 | — | | — | — | |

PRODUCTION EQUIPMENT MONITORING DEVICE

CROSS REFERENCE TO RELATED APPLICATIONS

This application is based on and claims priority under 35 U.S.C. §119 with respect to a Japanese Patent Application No. 2001-311803, filed on Oct. 9, 2001, the entire content of which is incorporated herein by reference.

BACKGROUND OF THE INVENTION

1. Field of the Invention

The present invention relates to a display device for displaying operating status of an industry machine used as production equipment, preferably, a machine tool.

2. Description of the Related Art

In a machine tool, a display control panel is used therein to display an operator operating status data representing operating status of the machine tool by reading out from a PLC for controlling the machine tool. The display control panel is provided with a display device.

In the display device of the above-mentioned control panel, there is used a CRT display or a LCD panel generally on which clear touch panel is superimposingly therewith arranged so as to be operable of touch input from an operator. A displayed screen is changed by this touch operation of the operator, and operating command to a control device can be performed. Contents of the operating status data are represented by displayed status of plural touch switches displayed on a predetermined section of the display device. Generally, contents of the operating status data representing execution status of operating process and operating status of the machine are displayed as touch switched. An example of thus control panel is described in Japanese Patent Application No. H8(1996)-107631.

Besides, the operating status data in this specification represents input data from various sensors installed in the production equipment, output data to actuators for operating the production equipment, input/output data with other control device controlling the machine tool, or data that is memorized into an internal memory of the PLC and is executed by sequence program based upon the aforementioned data.

Thus control panel is used as a operating monitor of the machine tool and is also used for searching causation of abnormal data when generated. In the causation that the machine tool does not operate normally, one is a device error that the device does not work with a breakdown. The other is a silent abnormal stop that the operating process is stopped when the condition for advancing the operating processes is not satisfied. In the silent abnormal stop, the causation is of that it is not recognized by an operating error of a limit switch whether a workpiece is transferred in from the production equipment in former process, and is of that a clamping operation is not completed formally at a clamping position of a workpiece by positioning error of the workpiece.

In a case of the device error, generated portion and causation of the operating error can be directly judged by such an error code, an LED representing an error status, and an error message displayed on the displayed screen of the control panel, etc. On the other hand, the operating error in the silent abnormal stop is noticed to the operator when a monitoring device of the production line detects a long-time stop of the machine. However, it is difficult to directly obtain error information for specifying causation of the operating error differently from the device error. In this situation, the operator presumes the causation of the operating error from the displayed status of the touch switch on the control panel. Further, the causation of the operating error is surveyed by an auxiliary device having compiling and monitoring function of the sequence program, if necessary.

However, problems described hereinbelow occurs when a surveillance of the causation in the silent abnormal stop is carried out by the method described above. Namely, it can be facilitated to judge which operating process in the production equipment is stopped due to the displayed status of the touch switch. Reversely, it cannot be judge how that operating process with the silent abnormal stop stops from the displayed status of the touch switch. If the operating process of the machine tool stops in a case that the displayed status of the touch switch represents "FIXTURE CLAMP" of the present operating process, it can be understood that the operating error occurs in "FIXTURE CLAMP" of the operating process, for example. There are however plural conditions for occurring the operating stop in "FIXTURE CLAMP" of the operating process, so that it cannot recognized which condition causes the operating error.

In this situation, it may be required to use the auxiliary device having the compiling and monitoring function of the sequence program. But, it is requested to bring the auxiliary device to the side of the production equipment (i.e., the control panel) for connecting the same therewith, and to supply the electric power thereto by wiring. It is further requested to wire the auxiliary device with the PLC for communication in order to transfer the sequence program stored therein to the auxiliary device. In such a situation, a sequence circuit block is searched to analyze the problematic operating process, and the present value of the related input/output signal is monitored by using the online monitoring function. As a result, the causation of the operating error can be specified. Thus, such a problem occurs that it is excessively time-spent to specify the operating error.

SUMMARY OF THE INVENTION

To solve the aforementioned problems, an object of the present invention is to provide a production equipment monitoring device which is capable of facilitating to specify an operating error.

A production equipment monitoring device according to the present invention displays on a display panel an operating status, as a touch switch, corresponding to a general segmentary operating process which collects, every operating category, processes of the machining operations carried out in the production equipment, by a touch switch display controller. After pressing the touch switch, the monitoring device further displays a name of a detail operating process and an address of a programmable logic controller to be referred thereto when judging an actual status of the detail operating process those of which are previously memorized in a detail process information memory. Therefore, it can be understood which machining operation generates an operating error.

Further, the monitoring device according to the present invention comprises a circuit monitoring controller displaying on the display panel a ladder circuit diagram corresponding to said the detail operating process displayed by a detail information display controller, and graphically displaying thereon the actual status of each control element that is included in the ladder circuit diagram and is readable from the programmable logic controller. Accordingly, an operator can distinguish a status of the operating error in more detail.

In the monitoring device according to the present invention, at least one of window-like screens displayed by the detail information display controller and by the circuit monitoring controller is superimposingly displayed on a window-like screen displayed by the touch switch display controller. As a result, the plural window-like screens can be visually confirmed at the same time.

BRIEF DESCRIPTION OF THE DRAWING FIGURES

Various other objects, features and attendant advantages of the present invention will readily be appreciated as the same becomes better understood by reference to the following detailed description of a preferred embodiment when considered in connection with the accompanying drawings, in which:

FIG. 3 is an explanatory table for screen definition data according to the present invention;

Figure 2:
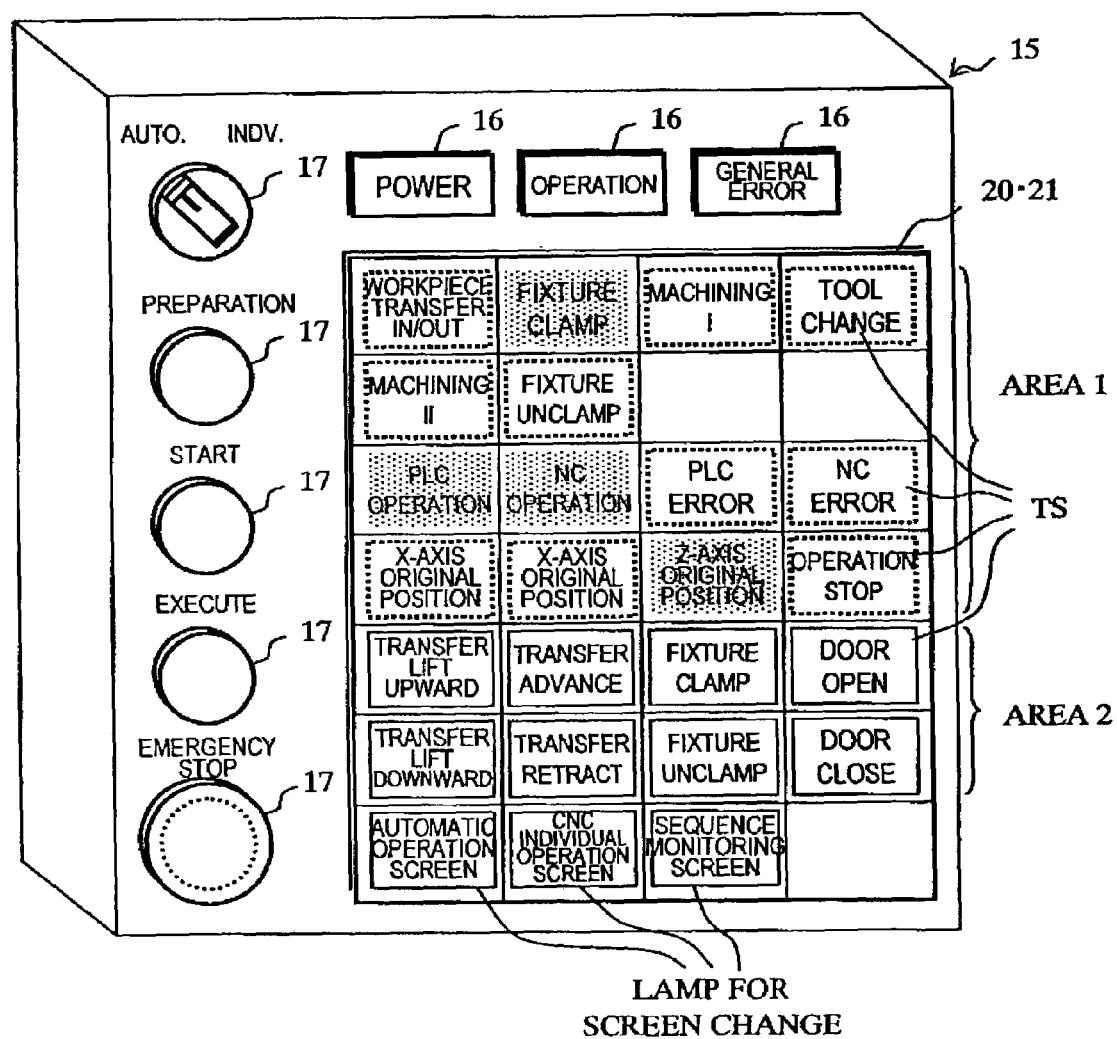
FIG. 2 is a perspective view of an operating panel according to the present invention.
Figure 5:
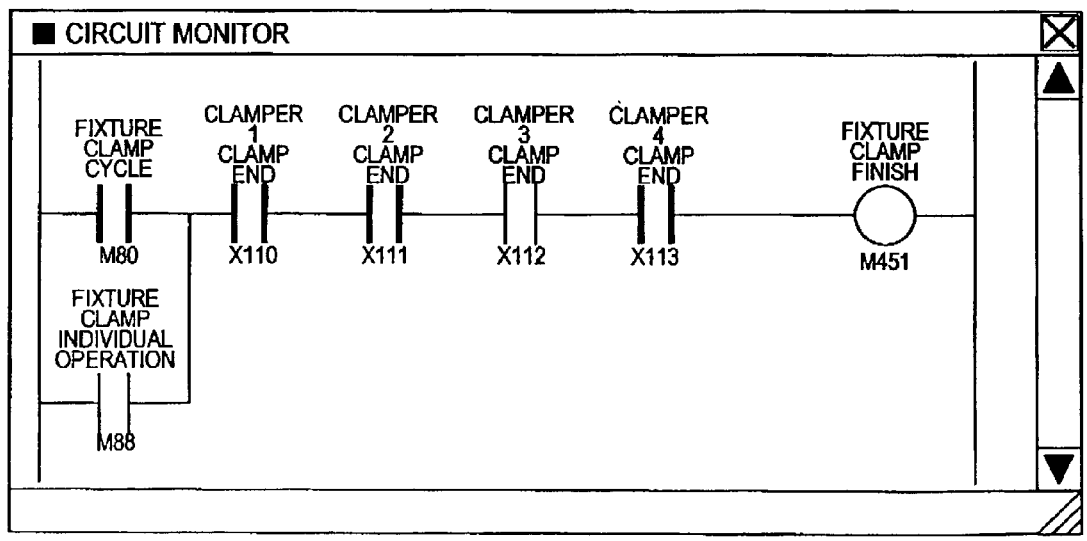
Figure 6:
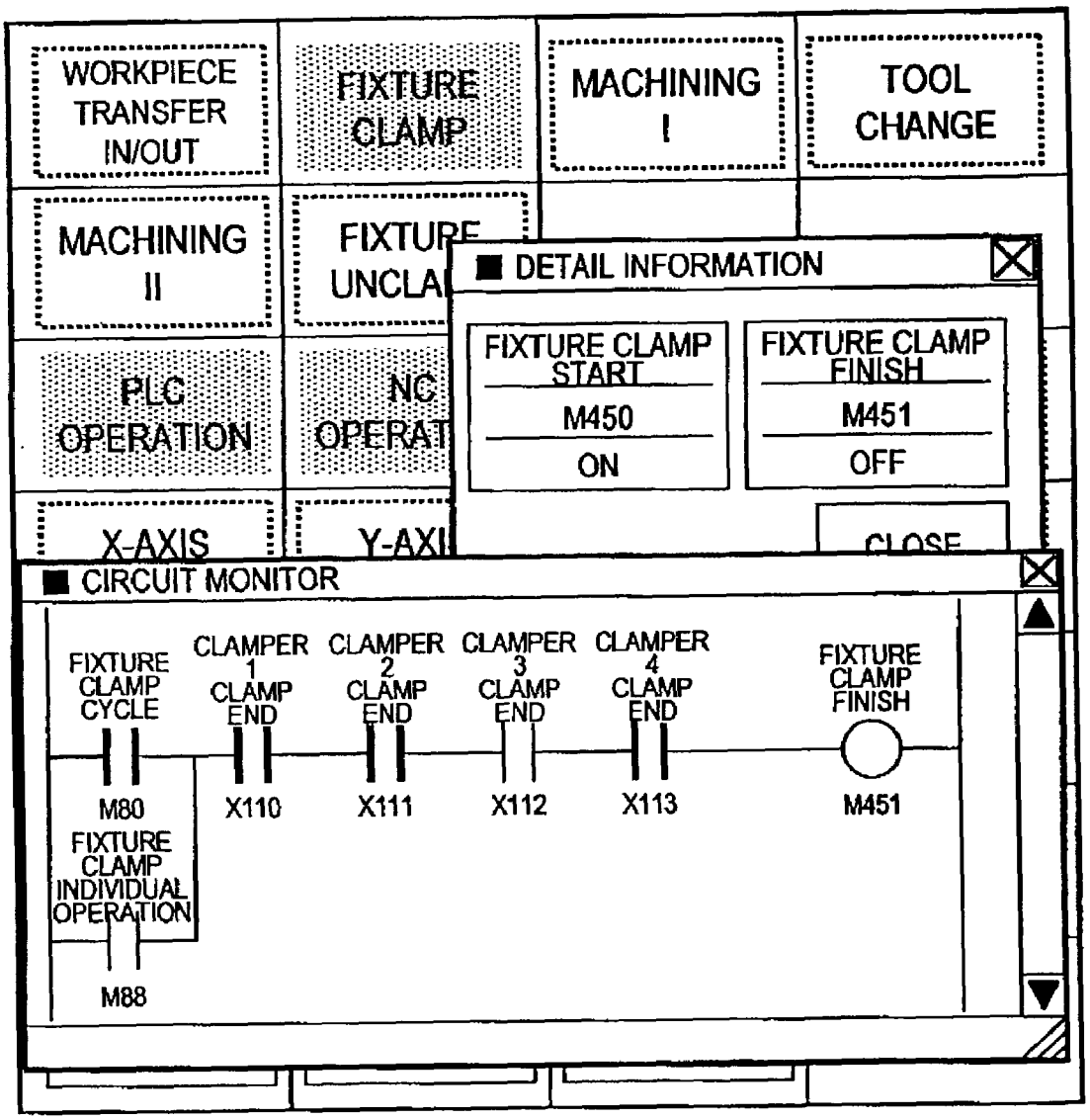
Figure 7:
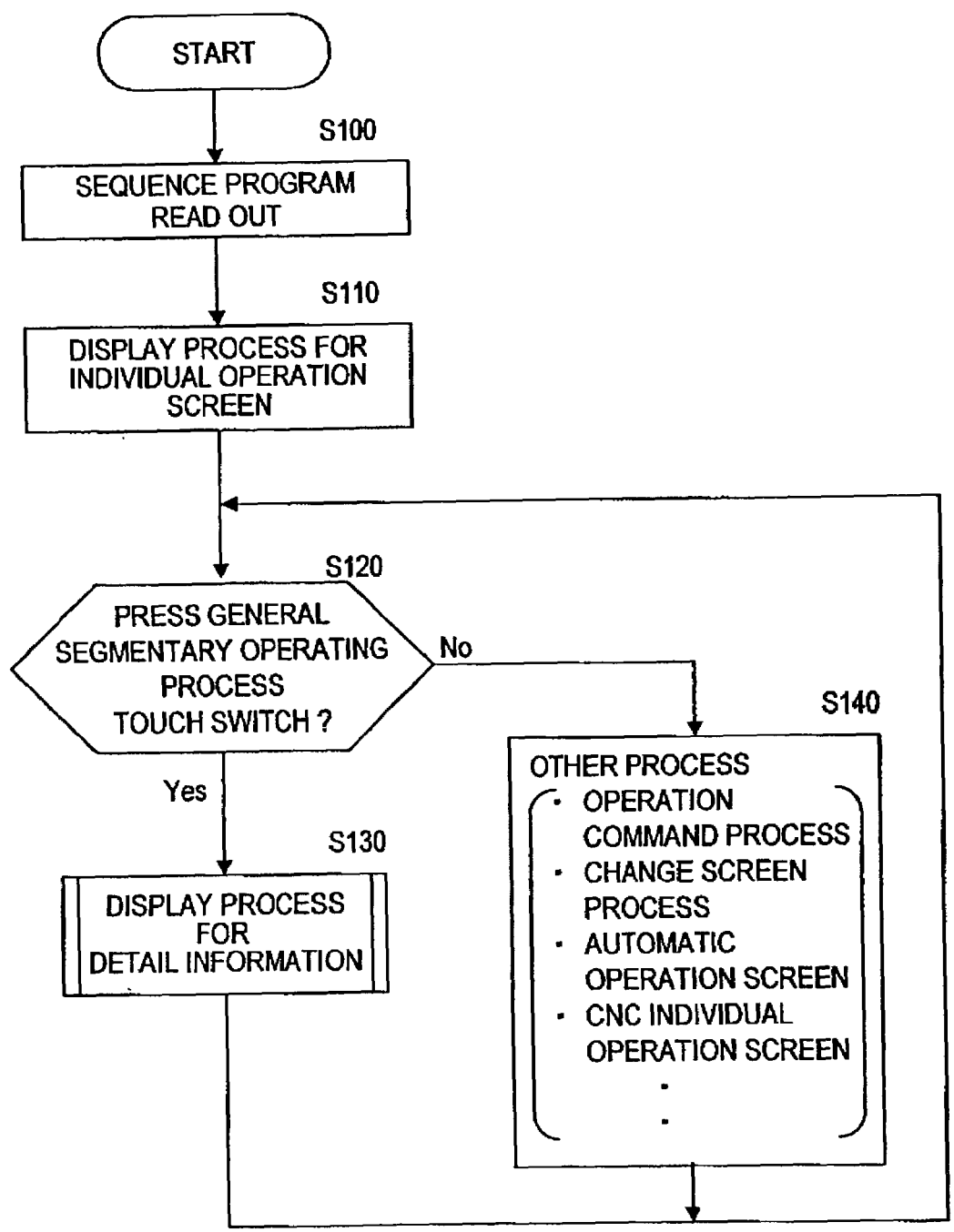
Figure 8:
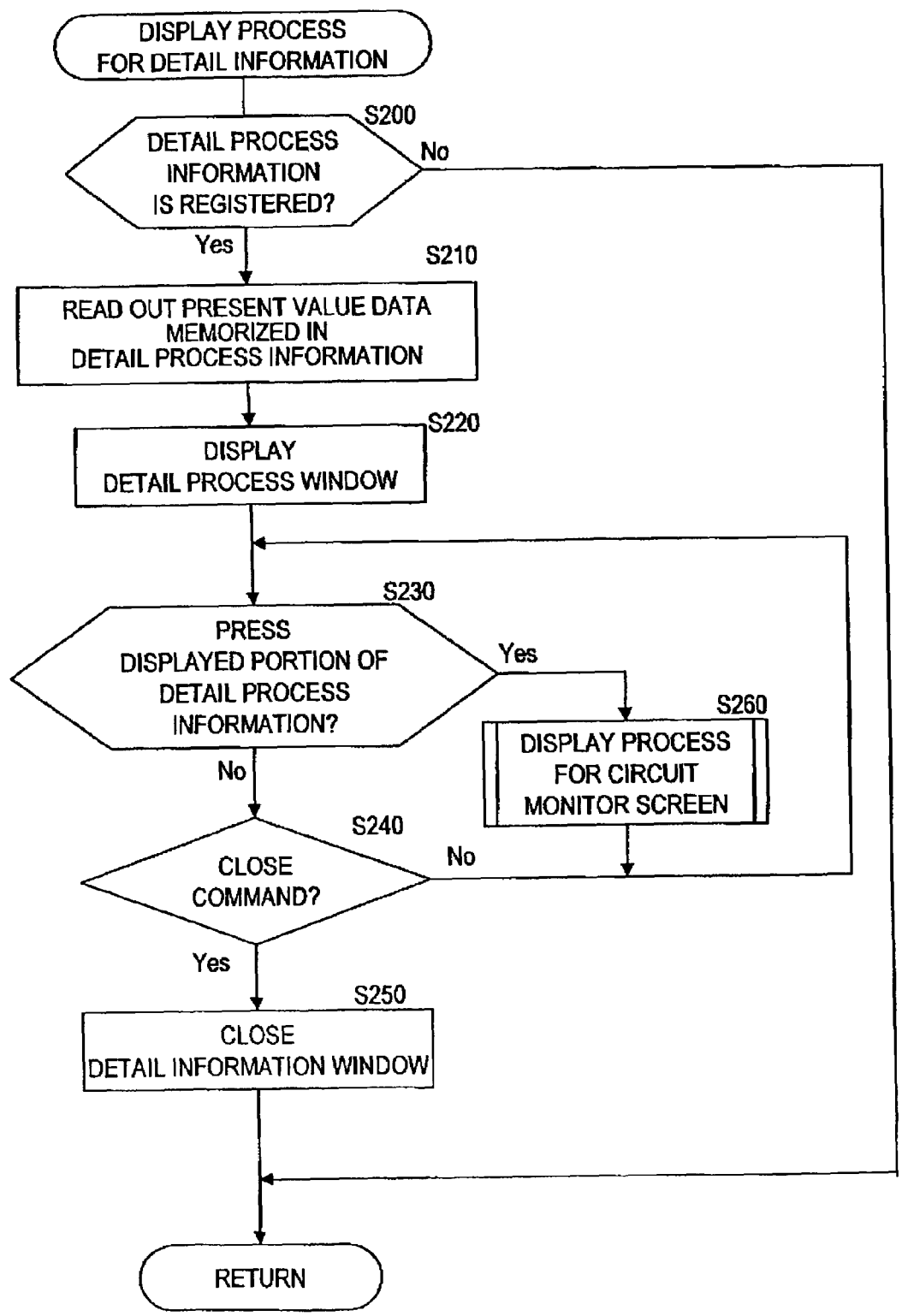
Figure 9:
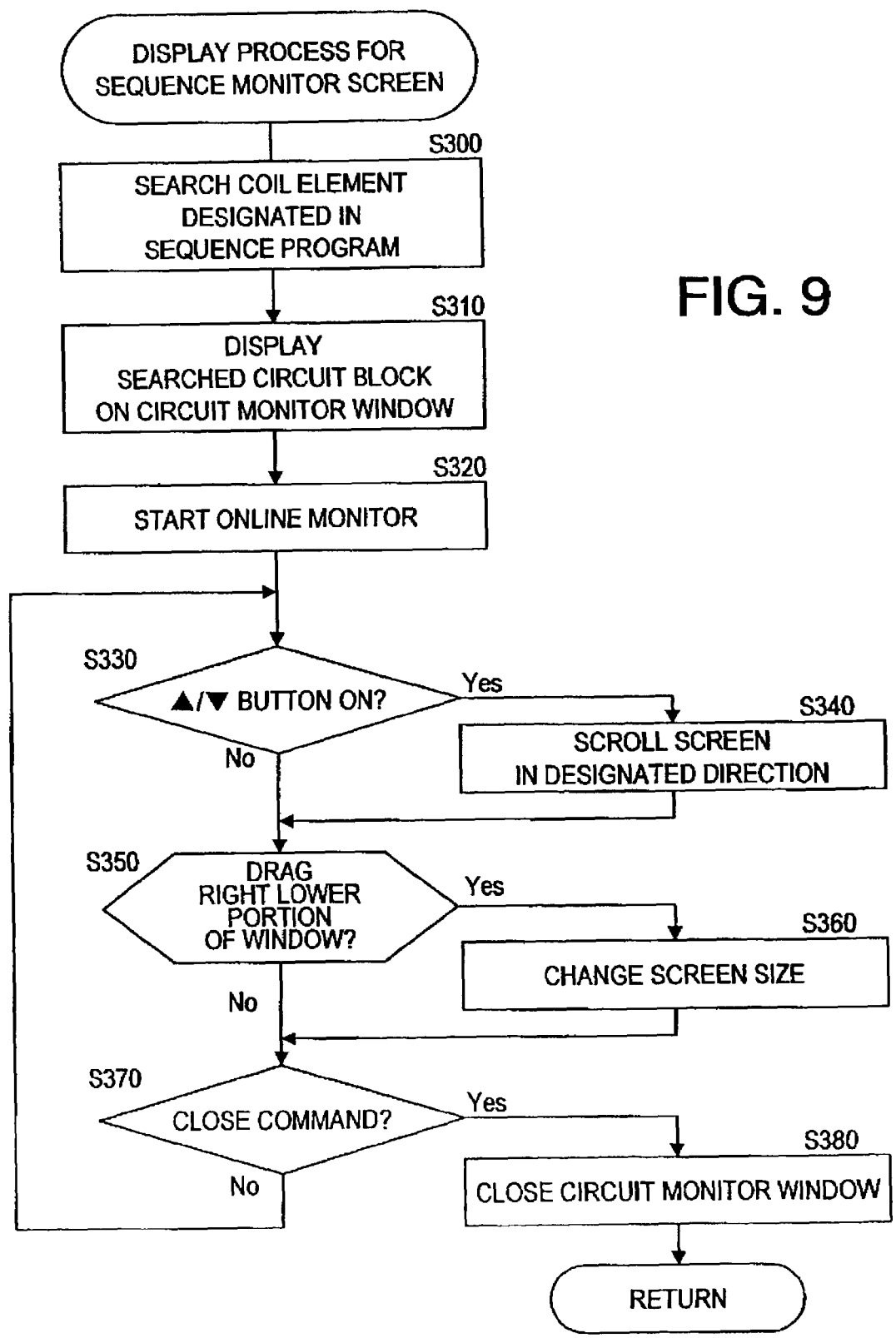

FIG. 5 an explanatory view of a circuit monitor window displayed on a LCD panel of the control panel in FIG. 2;

FIG. 6 is an explanatory view on which the detail information window and the circuit monitor window are superimposingly displayed on the LCD panel;

FIG. 7 is a flowchart of main process executed on a CPU of the control panel;

FIG. 8 is a flowchart for displaying process of detail information data executed on the CPU of the control panel; and FIG. 9 a flowchart for displaying process of circuit (ladder) monitor executed on the CPU of the control panel.

DESCRIPTION OF THE PREFERRED EMBODIMENT

An embodiment according to the present invention will be explained hereinafter with reference to the accompanying drawings.

Figure 1:
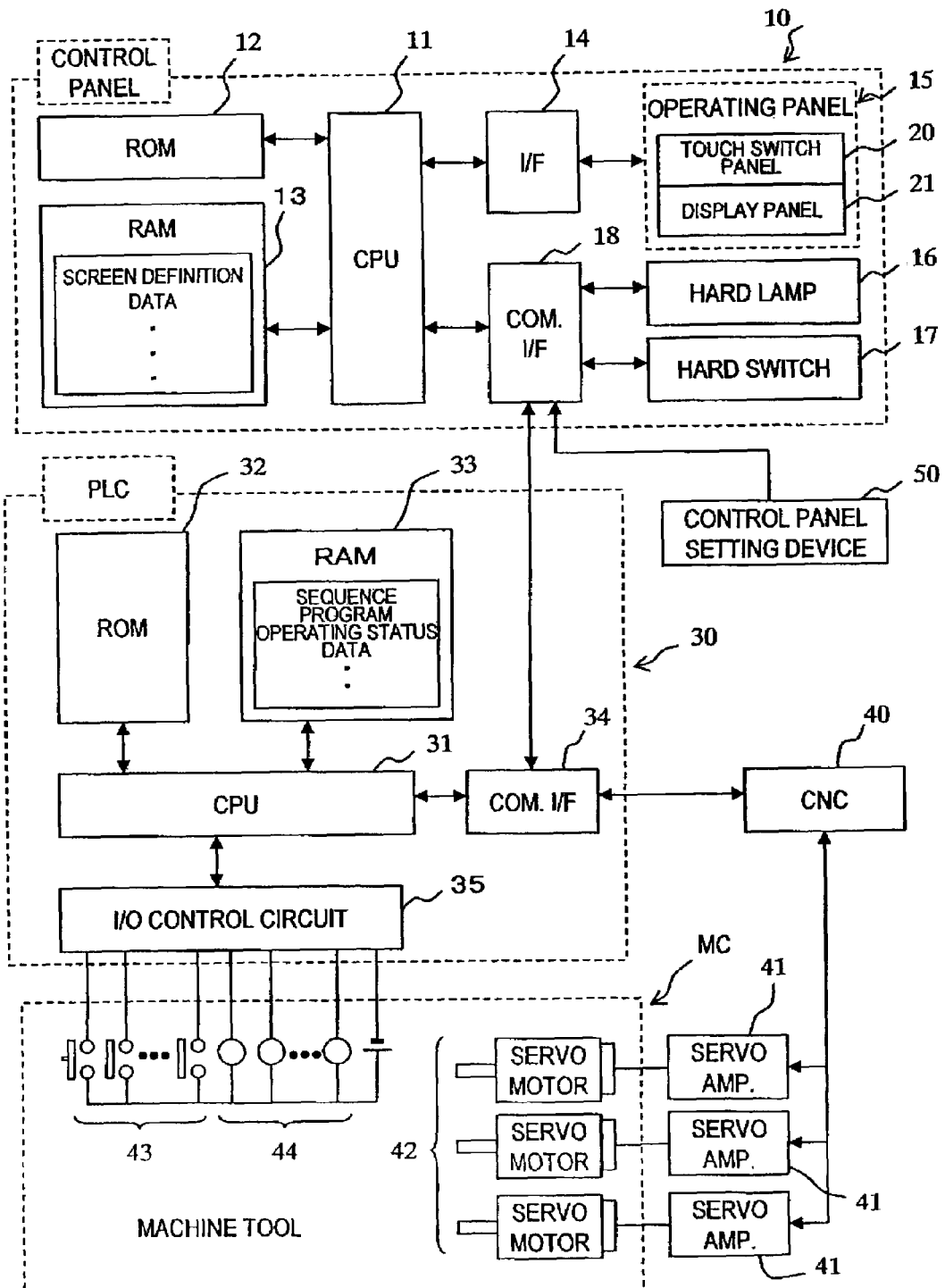
FIG. 1 is a block diagram of a control panel according to the present invention, a PLC connected therewith, and production equipment as a control target.

FIG. 1 is a block diagram showing a control panel 10, a programmable logic controller (referred to as "PLC" hereinafter) 30, and a machining center as a production equipment that is a control target of control operation. The control panel 10 is provided with a central processing unit ("CPU") 11 serving as a calculation device, a read only memory ("RAM") 12 in which system program, etc. are stored, and a random access memory ("RAM") 13. The CPU 11 is connected with an operating panel 15 through an interface ("I/F") 14.

As shown in FIG. 2, the operating panel 15 is composed of a liquid crystal display ("LCD") panel 21 and a touch switch screen witch is layered so as to cover all area of the LCD panel 21. The touch switch screen 20 is generally clear, in which displayed contents on the LCD panel 21 are transilluminatingly readable therethrough. On the touch switch screen 20, huge number of imperceptible touch sensors are arranged. If an operator touched the touch switch screen 20 with his finger, the touch sensor located at a touching point of the operator caused metastasis from "off" status to "on" status, whereby which touching point of the touch switch screen 20 can be detected. In other words, when the operator presses one of displayed elements on the LCD panel 21 with his finger through the touch switch screen 20, it can be identified in the CPU 11 which displayed element is pressed, because the CPU II detects the "on" status of the touch sensor corresponding to the displayed element pressed by the operator. Thus, it is so-called a "touch switch" such a displayed element that the CPU 11 can identify whether the operator presses or not that displayed element.

The CPU 11 is also connected with the PLC 30, bard lamps 16 and hard switches 17 through a communication interface ("communication I/F") 18. Further, the CPU 11 is connectable with a control panel setting device 50 via the communication I/F 18 when the connection thereto being requested. The hard lamps 16 are of an output element composed of hardware such a lamp and the like indicating that a power supply is being operated ("power supply") or that production equipment is being operated ("operation"), for example. The hard switches 17 are of an input element composed of such a hardware representing an automatic operation start switch or an emergency stop button, for example (referring to FIG. 2).

The control panel setting device 50, e.g., a personal computer can change a variety of settings by being connected to the control panel 10 when required. The displayed elements on the LCD panel 21 of the operating panel 15 can be changed by the control panel setting device 50 in accordance with the required variety of settings. If is changed a production equipment to another one that represents the control target connected with the control panel 10, several production equipment can be controlled by the same control panel 10 with setting thereto data corresponding to another one of the several production equipments. The equipment data created/compiled on the control panel setting device 50 is memorized, as screen definition data, into the RAM 13 from the communication I/F 18 via the CPU 11. Besides, the RAM 13 is backuped by a non-illustrated battery so as not to erase the stored data therein even when the control panel 10 is turned off.

The PLC 30 is composed of a CPU 31 that is a calculation unit, a ROM 32 memorizing system program and the like, and a RAM 33 wherein sequence program by ladder circuit and operating status data used therein are memorized. Otherwise, the PLC 30 is also provided with, as interfaces connected to external device, an input/output ("I/O") control unit 35 and a communication I/F 34. The communication I/F 34 exists to communicate with the communication I/F 18 of the control panel 10 and a computer numerical controller ("CNC") 40. The CNC 40 outputs command signals to each serve amplifiers 41 in accordance with numerical control ("NC") program memorized in system program of an internal program memory, as referring to data inputted from the PLC 30. Each of the servo amplifiers 41 supplies power to each servomotor 42 to drive according to the command signals.

In the machining center MC, each of mutually perpendicular X-axis, Y-axis and Z-axis can be controlled by the CNC 40 in positioning control. A variety of auxiliary functions can be sequentially controlled by the PLC 30 in cooperation with thus control process. In the explanation of this embodiment, the functions executed in the CNC 40 do not relate to the present invention directly, so that those are omitted in this specification. Control target of the aforementioned sequence control are such start/stop operation of a tool spindle, clamp/unclamp operation of a tool attached thereto, clamp/unclamp operation of a workpiece, on/off control operation of various pumps for supplying coolant or lubricant oil, and further start/stop operation of an automatic tool changer, for example.

In the machining center, there are arranged at several portions thereof various limit switches, rotary switches operated by the operator, and pushing switches in order to confirm operation of these control targets. In FIG. 1, these switches are collectively denoted to reference number "43", each signal outputted therefrom is inputted into the I/O control circuit 35. Similarly, a collective reference number "44" in FIG. 1 represents a lot of electromagnet relays for on/off-controlling the above-mentioned various control targets. By on/off operation of the electromagnet relay 44, are driven electric motors, various actuators such a solenoid valve.

As well known, the PLC 30 executes sequence program (ladder program made by a user/operator) for sequence control memorized in the RAM 33 in accordance with system program for sequence control memorized in the ROM 32, and then sequentially controls the various control targets of the machining center MC. As briefly explaining a sample of the sequence control, in a case of clamping a workpiece, a workpiece to be machined is positioned to a predetermined machining position from a non-illustrated transfer apparatus. At that time, confirmation of positioning the workpiece to the predetermined machining position excites a limit switch (one of the switches 43) to on status, whereby the electromagnet relay 44 for operating a damper is urged by its operating signal of the limit switch. Therefore, a solenoid valve of a hydraulic cylinder for clamping the workpiece is operated by exciting of the electromagnet relay 44 according to the operating signal of the limit switch, and then the workpiece can be clamped by the damper with operation of the cylinder, for example.

In the control panel 10, an operating signal is inputted into the PLC 30 through the communication I/F 18 when the hard switch 17 in FIG. 2 is operated. This input of the control signal makes the PLC 30 to execute the sequence control. Namely, electric power for driving the servomotor 42 is supplied to the servo amplifier 41 by pressing an operation preparation switch, so that the machining center MC becomes to be operable. In such a situation, the PLC 30 can be executed according to the sequence program with pressing a start switch Next, when an operation switch is pressed in a condition that an automatic/individual changing switch is turned to "automatic operation", the PLC 30 starts the automatic operation in accordance with the sequence program to operate the machining center MC. At this time, the PLC 30 outputs an execution command of the NC program to the CNC 40, whereby each control axis of the machining center MC can be controlled according to the NC program.

On the LCD panel 21 of the control panel 10, are as a displayed screen defined "automatic operation mode screen", "individual CNC operation mode screen", "sequence program monitor mode screen", and "individual operation mode screen", in which these mode screens can be switched to each other.

On the "automatic operation mode screen (not shown)", present position of each of the control axes is displayed when the automatic/individual changing switch is indexed to at a position "automatic" with the PLC 30 and the CNC 40 being operated by "automatic" mode.

The "individual CNC operation screen (not shown)" is prepared for using the CNC 40 with "individual" mode, on which "control axis selection switch", "feed rate indication switch", and "manual axis feed switch" are displayed as a soft switch and as a touch switch. The operator can manually operate one of the X-, Y- and Z-control axis indicated by the "manual axis feed switch" with pushing the touching switch.

The "sequence program monitor mode screen (not shown)" is a screen displaying the sequence program for online-monitoring.

On the LCD panel 21, the "individual operation mode screen" shown in FIG. 2 is in general displayed as a representative sample. Through this screen, the operator gets operation conditions of the production equipment according to display conditions (on/off) of the touch switch TS thereon, and can also command to the PLC 30. The "individual operation mode screen" is divided to a first display area ("AREA 1") located at an upper portion thereof for displaying a lot of touch switch TS as to the operating condition of the production equipment, and to a second display area ("AREA 2") located at a lower screen thereof for displaying that switches TS that are to execute operating command to the PLC 30. Otherwise, a special touch switch is displayed on the LCD panel 21 to change one mode screen to each other.

As shown in FIG. 2, each of the touch switches TS on the first display area "AREA 1" has two types, one is outline and its central area compassed thereby lightening touch switch TS, and the other is only outline lightening touch switch TS, in which each of two type touch switches are controlled individually. When only the outline of the touch switch TS is lightened, e.g., such as "PLC ABNORMAL", "OPERATION STOP" and "TOOL CHANGE", the operator can distinguish that these touch switches TS become to be turned off. On the other hand, when both the outline and its central area compassed thereby in the touch switches TS are lightened with the same color, e.g., such as "FIXTURE CLAMP", "PLC OPERATING", "NC OPERATING" and "Z-AXIS ORIGINAL POSITION", the operator can distinguish that these touch switches TS become to be turned on. Concretely, whether the central area compassed by the outline of the touch switch TS is lightened or not is determined in correspondence with on/off status of specific one bit on operating condition data memorized in the RAM 33 of the PLC 30.

The touch switches TS of the second display area "AREA 2" are to execute operating command to operating elements that are the control targets of the PLC 30 in the individual operation mode. When the touch switch TS on the "AREA 2" is pressed by the operator, an output command assigned to the pressed touch switch TS is transmitted to the PLC 30 through the communication I/F 18. This output command is composed of address data and on/off command of one bit. The PLC 30 controls so as to perform the electro-magnet relay designated by the address data of the output command to on/off operation according to the on/off command thereof.

In each of the aforementioned touch switches TS, attribute of display color and corresponding address data is created/complied on the control panel setting device 50, and is defined with the screen definition data stored in the RAM 13.

The screen definition data defining the attribute of the touch switch TS on "AREA 1", as exampled in FIG. 3, includes at least "DISPLAY NAME", "LIGHTENING COLOR" and "DISPLAYED ADDRESS" every ID code of the touch switch TS.

The "DISPLAY NAME" is a character string superimposingly displayed on the touch switch TS and therefore, the operator can notionally recognize a content of the touch switch TS.

The "DISPLAYED ADDRESS" represents a bit address of the operating condition data directly assigned to the touch switch TS. If the operating condition data of address designated by "LIGHTENING" is "1", the corresponding touch switch TS thereto is lightened on its area compassed by the outline thereof. On the other hand, if the operating condition data of address designated by the "LIGHTENING" is "0", the corresponding touch switch TS thereto is not lightened on its area compassed by the outline thereof and is lightened on only its outline. Similarly, the operating condition data of address designated by "FLASHING" is "1", the corresponding touch switch TS thereto is flashed on its area compassed by the outline thereof. If the operating condition data of address designated by "FLASHING" is "0", the corresponding touch switch TS thereto is not flashed on its area compassed by the outline thereof and is lightened on only its outline.

The "LIGHTENING COLOR" is designate displayed color on the LCD panel 21 when the touch switch TS is lightened or is not lightened. In FIG. 3, the displayed color lightening the touch switch TS is set to be "RD (red)", so that both the outline and its area compassed thereby is lightened with color "red". On the other hand, the displayed color is set to be "BL(blue)" when the corresponding touch switch TS is not lightened, so that only the outline thereof is lightened with color "blue". The operating condition data of address designated by "LIGHTENING" or "FLASHING" is read out from the PLC 30 at a predetermined time interval (e.g., 100 ms).

The content displayed by the touch switch TS on the "AREA 1" includes "PLC OPERATING", "NC OPERATING" and the like that are conditions of the control devices, "VICINITY OF X-AXIS ORIGINAL POSITION", "VICINITY OF Y-AXIS ORIGINAL POSITION" and the like that are data of axial position, and "WORKPIECE TRANSFER IN/OUT", "FIXTURE CLAMP", "MACHINING" and the like that are operating status of general segmentary operating process that presents various process of the machining center MC. The touch switch TS representing operating status of the general segmentary operating process is flashed in operation of that general segmentary operating process on whole portion of its touch switch. On the other hand, when the general segmentary operating process is not operated, the touch switch TS corresponding thereto is lightened on its outline only and is not flashed. With this status of the touch switch TS, the operator can recognize which of the general segmentary operating process is in actual operation The touch switch TS representing operating status of the general segmentary operating process will be referred to as a "general segmentary operating process touch switch TS" hereinafter.

In a feature according to the present embodiment, is memorized detail process information corresponding to the general segmentary operating process touch switch TS. The detail process information is one part of the screen definition data, in which it is created/compiled by the control panel setting device 50, and then is memorized into the RAM 13. A detail operating process is of fractioning the general segmentary operating process, and the detail process information corresponding thereto includes a name thereof and an address thereof on the operating condition data read out from the PLC 30 when operating status of the detail process information is judged. One or a few sets of name and address of the detail operating process may be set as the detail process information in connection with one of the general segmentary operating process.

As shown in FIG. 3, the detail operating process includes such a process that is "WORKPIECE TRANSFER IN/OUT PROCESS START", "TRANSFER RISE", "TRANSFER ADVANCE" and "WORKPIECE TRANSFER IN/OUT FINISH", in a workpiece transferring in/out process. Further, "FIXTURE CLAMP START", "FIXTURE CLAMP FINISH" and etc. are included as a fixture clamping process.

The address set in the detail operating process may be directly designated as one of the switches 43 arranged onto the machining center MC. Further, the address set in the detail operating process may be designated into data calculated according to the sequence program based upon the input/output signals from the switches 43 and/or the electromagnet relay 44, the input data from the CNC 40 and etc. In the detail process information shown by FIG. 3, the address of "TRANSFER RISE" is directly designated to the limit switch 43 which is turned on when the transfer rises, this address represents the former. On the other hand, the detail operating process of "FIXTURE CLAMP FINISH" corresponds to the latter because it is turned on by the sequence process when all of a few dampers for clamping the workpiece are turned on in which all the limit switched 43 representing "CLAMP END" are turned on also.

When the touch switch TS of the general segmentary operating process is pushed by the operator, data read in/out command corresponding thereto is transmitted to the PLC 30. In response to this data read in/out command, the PLC retransmits to the control panel 10 present value data of the operation condition data in the designated address. In a case that several addresses are registered in the detail process information for the pushed touch switch TS of the general segmentary operating process, the present value data about of all the operation condition data is read out from the PLC 30 to the control panel 10.

Figure 4:
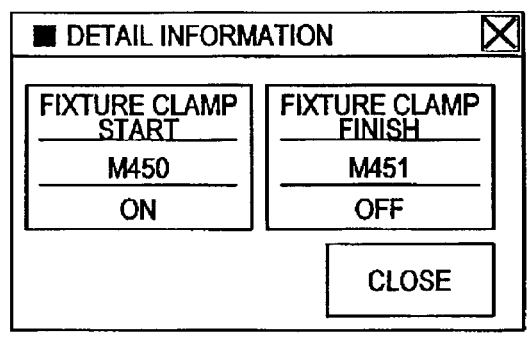
FIG. 4 is an explanatory view of a detail information window displayed on a LCD panel of the control panel in FIG. 2.

After reading out the present value of the operation condition data, a detail information window is opened on the LCD panel 21. On the detail information window, there are displayed the name and address of the detail operating process stored in the detail process information, the present value of the operating condition data designated by its address. The detail information window is exampled as shown in FIG. 4.

In another feature of this embodiment according to the present invention, a circuit monitor window is openly displayed when a part of the detail process information displayed on the detail information window is pushed by the operator. On the circuit monitor window, there are displayed a ladder circuit of the detail operating process designated by the operator, and the operating status of each control element corresponding to the ladder circuit that is included in the aforementioned ladder circuit and that is read out from the PLC 30. The control element represents element constructing the ladder circuit and including a contact point of the relay, a data register, a timer, a counter and etc.

One example of the circuit monitor window is shown in FIG. 5. The contact element shown by a bold line in FIG. 5 (e.g., "M80", "X110", "X111" and "X113") represent that is turned on, while those shown by a fine line represent that is turned off. With this bold/fine line, the operator can easily judge which contact element is turned on or off. The limit switch X112 representing the clamp end of the damper 3 is not turned on, so that it is judged that the detail operating process of "FIXTURE CLAMP FINISH" is not operated, for example, as shown in FIG. 5.

On this circuit monitor window, the displayed contents are scrolled upward/downward by pressing "▲" or "▼" button, whereby aforementioned or subsequent sequence circuit in block can be monitored. Further, the operator can change an area of the circuit monitor window by drag a right-lower portion shown by an inclined line with his pressing finger.

As exampled in FIG. 6, the detail information window and the circuit monitor window are superimposingly displayed on the individual operation mode screen Accordingly, the operator can look at the displayed contents on each of the screen at the same time without changing the screen Functional processes in the CPU 11 of the control panel 10 according to the aforementioned embodiment will be explained hereinafter with reference to FIGS. 7–9 in detail. FIG. 7 shows a main flowchart executed in the control panel 10. The sequence program stored in the RAM 33 of the PLC 30 is read out at step S100 after the power supply is turned OIL The read out sequence program is referred to when displaying the circuit monitor window.

At subsequent step S110, the individual operation mode screen is displayed as an initial screen. When pressing the touch switch TS for the general segmentary operating process which switch is displayed on the first display area "AREA 1" of the individual operating mode screen, this pressing operation is detected at step S120, and then a process for displaying the detail operation information is executed at step S130. In a case that the touch switch TS except for that for the general segmentary operating process is pressed, a process corresponding to the pressed process is executed at step S140. The processes executed at step S1140 include a process for commanding on the "AREA 2" of the individual operating mode screen, for changing the screen to each other, and for executing on the automatic operating mode screen or on the individual operation of the CNC. The process executed at step S140 does not directly relate to the feature of the present invention, the detail explanation thereof is omitted.

FIG. 8 shows a subroutine executed at step 130, that is concrete process for displaying the detail information. At step 200, it is recognizes whether the detail process information is registered or not on the general segmentary operating process touch switch TS pressed at step S120. If not registered, the process goes back to a process "RETURN" immediately and then the process for displaying the detail information is finished.

If the detail process information is registered, the PLC at step S210 reads out the present value of the operating status data designated by the address that is memorized on the detail process information. This reading out process is executed by transmitting to the PLC 30 data reading out command thereto through the communication I/F 18. The PLC 30 reads out the present value of the operating status data corresponding to the designated address in response to the data reading out command, and then the read out present value is retransferred. If the several addresses are registered, the transmission of the reading out command is repeatedly performed, so that the present values of the operating status data corresponding to all the designated addresses are read out.

Upon completion of reading out the present values for the operating status data corresponding to all the designated addresses memorized in the detail process information, the detail information window as exampled in FIG. 4 is displayed at step S220. At step S230, it is thereafter monitored whether a display portion (i.e., the name, address or present value) of the detail process information displayed on the detail information window is pressed or not. If this display portion is pressed, a displaying process for a circuit monitor screen is performed at step S260.

It is further monitored at step S240 whether a "CLOSE" button of the detail information window or "x" located at a right-upper portion thereof is pressed or not to close the detail information window as a close command. If the close command (i.e., pressing "CLOSE" or "x") is performed at step S240, the detail information window is closed at step S250.

FIG. 9 shows a detail subroutine for the displaying process of the circuit monitor screen. At step S300, is searched the blocks that turns on or off the operating status date designated by the address of the detail process information which is pressed at step S230, in accordance with every blocks of the sequence program read out at step S100. The searched block is displayed on the circuit monitor window at step S310. An online monitor is thereafter started at step S320. The online monitor means a function for displaying status of each control element (on/off of the contact elements, the present value of register data and etc.) which is defined on a sequence circuit block displayed on the circuit monitor window by reading out from the PLC 30. In a case that the sequence circuit block of FIG is displayed, it is displayed by reading out from the PLC 30 whether detail processes of "FIXTURE CLAMP CYCLE", "CLAMP END ON CLAMPER 1" "CLAMP END ON CLAMPER 4" and "FIXTURE CLAMP INDIVIDUAL OPERATION" are respectively performed or not by reading out from the PLC 30 to display the operating status of the detail operating process. Namely, if the control element corresponding to the operating process "CLAMP END ON CLAMPER 1" is performed (turned on), the contact element "X110" is displayed with the bold line. This reading out is performed every predetermined time intervals (e.g., 100 ms) to renew the displayed contents as to the contact element.

While performing the operating process for the online monitor, it is judge at step S330 whether the scroll button (▲/▼) is touched or not In response to the touched scroll button, the sequence circuit displayed on the circuit monitor screen is upward or downward scrolled. With this scroll, the ladder program of the former/next block and the present value of each the control elements can be monitored.

At step 350, it is monitored whether the right lower portion of the window is dragged. A screen (window) size is changed at step S360 when the right-lower portion of the window is dragged. With this drag, larger area of the ladder circuit can be monitored.

It is at step S370 monitored whether "x" button of the right-upper portion on the screen (window) is touched or not. If touched, the circuit monitor window is closed at step S380. At the same time of closing the window, the online monitor operation is finished thereat.

As explained above, according to this embodiment, the present general segmentary operating process is judged with the displayed status of the touch switch TS. Therefore, it can be distinguished which general segmentary operating process is stopped even if silent abnormal stop process is generated. Further, the name and address of the detail operating process registered in the detail process information and the present value of the operating status data designated by its address arc displayed on the detail information window by pressing the general segmentary operating process touch switch TS, so that it can be easily specified such an operating process wherein an abnormal process is generated.

By pressing the displayed portion of the detail information on the detail information window, the ladder circuit of the detail operating process corresponding thereto can be displayed on the circuit monitor window, and the operating status of the detail operating process can be online-monitored. Accordingly, it can be exactly judged such a factor generating the abnormal process.

What is claimed is:

1. A production equipment monitoring device comprising:
   a display panel configured to provide a touch switch function;
   a data exchanger configured to communicate various data with a programmable logic controller that is configured to control machining operations carried out in production equipment in accordance with a sequence program;
   a touch switch display controller configured to display on said display panel a touch switch corresponding to a general segmentary operating process, said general segmentary operating process collects, for every operating category, data on processes of the machining operations carried out in the production equipment;
   an operating status display controller configured to distinguishably display on said display panel said touch switch and its operating status corresponding to said general segmentary operating process which is presently carried out in the machining operation of the production equipment;
   a detail process information memory configured to store a name of a detail operating process and an address of the programmable logic controller to be referred thereto when judging an actual status of said detail operating process, said detail operating process is generated by dividing said general segmentary operating process corresponding to said touch switches into an operating process of the machining operation; and
   a detail information display controller configured to display on said display panel, when said touch switch is pressed, the name of said detail operating process included in said general segmentary operating process corresponding to said pressed touch switch, and the actual status of said detail operating process obtained by said address of the programmable logic controller.

2. A production equipment monitoring device according to claim 1, further comprising:
   a circuit monitoring controller configured to display on said display panel a ladder circuit diagram corresponding to said detail operating process displayed by said detail information display controller, and to graphically display thereon the actual status of each control element that is included in the ladder circuit diagram and is readable from the programmable logic controller.

3. A production equipment monitoring device according to claim 2, wherein at least one of a window-like screen displayed by said detail information display controller and by said circuit monitoring controller is superimposingly displayed on a window-like screen displayed by said touch switch display controller.

4. A production equipment monitoring device comprising:
   means for providing a touch switch function;
   means for communicating various data with a programmable logic controller that is configured to control machining operations carried out in production equipment in accordance with a sequence program;
   means for displaying a touch switch corresponding to a general segmentary operating process, said general segmentary operating process collects, for every operating category, data on processes of the machining operations carried out in the production equipment for every operating category;
   means for distinguishably displaying said touch switch and its operating status corresponding to said general segmentary operating process which is presently carried out in the machining operation of the production equipment;
   means for storing a name of a detail operating process and an address of the programmable logic controller to be referred thereto when judging an actual status of said detail operating process, said detail operating process being configured to be generated by dividing said general segmentary operating process corresponding to said touch switches into an operating process of the machining operation; and
   means for displaying, when said touch switch is pressed, the name of said detail operating process included in said general segmentary operating process corresponding to said pressed touch switch, and the actual status of said detail operating process obtained by said address of the programmable logic controller.

* * * * *